United States Patent
Oppelt

(10) Patent No.: US 7,228,902 B2
(45) Date of Patent: Jun. 12, 2007

(54) HIGH DATA RATE BOREHOLE TELEMETRY SYSTEM

(75) Inventor: Joachim Oppelt, Hannover (DE)

(73) Assignee: Baker Hughes Incorporated, Houston, TX (US)

( * ) Notice: Subject to any disclaimer, the term of this patent is extended or adjusted under 35 U.S.C. 154(b) by 252 days.

(21) Appl. No.: 10/678,569

(22) Filed: Oct. 3, 2003

(65) Prior Publication Data

US 2004/0124994 A1    Jul. 1, 2004

Related U.S. Application Data

(60) Provisional application No. 60/416,739, filed on Oct. 7, 2002.

(51) Int. Cl.
 *E21B 47/12* (2006.01)
 *G01V 3/18* (2006.01)

(52) U.S. Cl. .............. 166/250.02; 166/66; 175/50; 324/333; 340/855.7; 340/854.5

(58) Field of Classification Search ........... 166/250.01, 166/242.1, 255.1, 66, 250.02, 381; 702/6; 324/333, 355, 356; 340/853.1, 853.7, 854.5, 340/855.7; 367/82, 117; 175/40, 50
See application file for complete search history.

(56) References Cited

U.S. PATENT DOCUMENTS

| | | | | |
|---|---|---|---|---|
| 1,470,430 A * | 10/1923 | Ellison | ................... | 379/395 |
| 3,129,394 A * | 4/1964 | Long | .................... | 333/27 |
| 3,793,632 A | 2/1974 | Still | | |
| 5,363,094 A * | 11/1994 | Staron et al. | ............ | 340/854.6 |
| 6,075,461 A | 6/2000 | Smith | | |
| 6,177,882 B1 | 1/2001 | Ringgenberg et al. | | |
| 6,218,959 B1 | 4/2001 | Smith | | |
| 6,234,257 B1 | 5/2001 | Ciglenec et al. | | |
| 6,257,355 B1 * | 7/2001 | Baker | ..................... | 175/50 |
| 6,320,820 B1 | 11/2001 | Gardner et al. | | |
| 6,333,700 B1 * | 12/2001 | Thomeer et al. | ......... | 340/854.8 |
| 6,412,555 B1 * | 7/2002 | Sten-Halvorsen et al. | ..... | 166/250.03 |
| 6,467,387 B1 * | 10/2002 | Espinosa et al. | ............ | 89/1.15 |
| 6,498,568 B1 * | 12/2002 | Austin et al. | ............ | 340/854.5 |
| 6,525,540 B1 * | 2/2003 | Kong et al. | ................ | 324/338 |
| 6,978,833 B2 * | 12/2005 | Salamitou et al. | ..... | 166/255.01 |
| 2003/0098799 A1 * | 5/2003 | Zimmerman | ............. | 340/854.6 |
| 2004/0238166 A1 * | 12/2004 | Salamitou et al. | ....... | 166/255.1 |

* cited by examiner

*Primary Examiner*—Kenneth Thompson
(74) *Attorney, Agent, or Firm*—Madan, Mossman & Sriram, P.C.

(57) ABSTRACT

A system and method for communicating information between downhole equipment in a wellbore and surface equipment, comprising a first device disposed in a wellbore for receiving at least one first signal and transmitting at least one second signal. A surface device is used for receiving the at least one second signal and transmitting the at least one first signal. At least one repeater is disposed at a predetermined location in a wall of the wellbore for receiving and retransmitting the first signal and the second signal. A method for communicating information between downhole equipment in a wellbore and surface equipment, comprises deploying a tubular member in the wellbore, the tubular member having a transmitter disposed therein; disposing at least one signal repeater at a predetermined location in a wall of the wellbore; and transmitting a signal from the transmitter to a surface receiver through the at least one repeater.

34 Claims, 3 Drawing Sheets

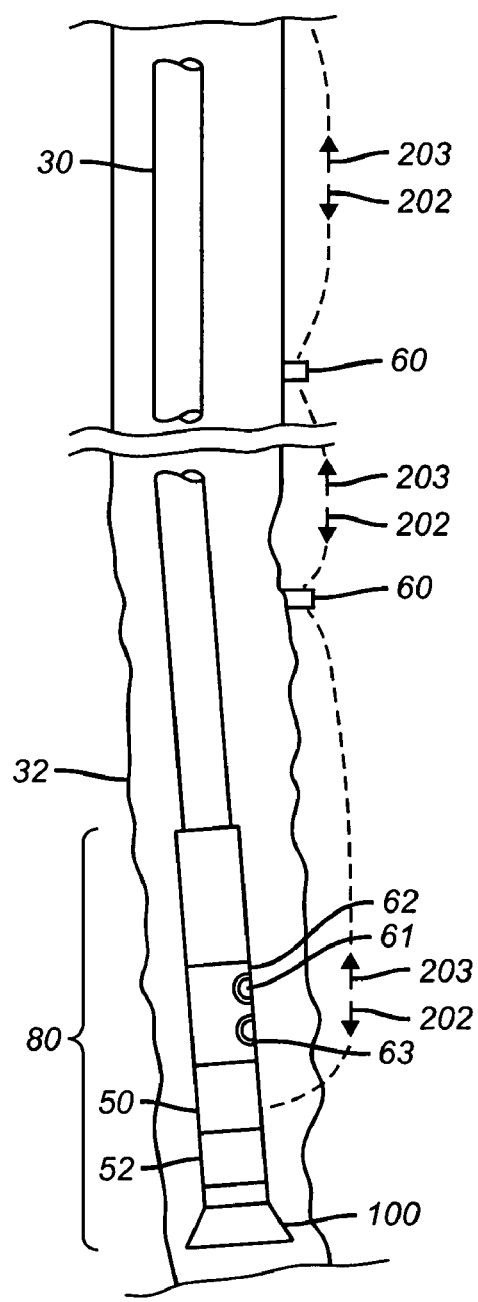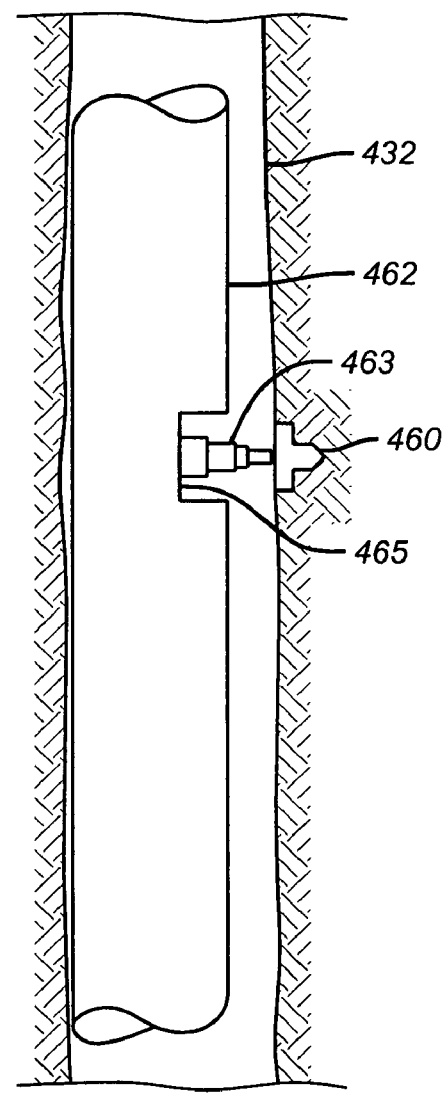
FIG. 3
FIG. 4

HIGH DATA RATE BOREHOLE TELEMETRY SYSTEM

CROSS-REFERENCE TO RELATED APPLICATIONS

This application claims the benefit of U.S. Provisional Application No. 60/416,739, filed Oct. 7, 2002.

STATEMENT REGARDING FEDERALLY SPONSORED RESEARCH OR DEVELOPMENT

Not applicable

FIELD OF THE INVENTION

This invention relates in general to downhole telemetry and, in particular to, the use of downhole signal repeaters for signal communication between surface equipment and downhole equipment.

BACKGROUND OF THE INVENTION

Without limiting the scope of the invention, its background is described in connection with transmitting downhole data to the surface during measurements while drilling (MWD), as an example. It should be noted that the principles of the present invention are applicable not only during drilling, but throughout the life of a wellbore including, but not limited to, during logging, testing, completing and producing a well. The principles of the invention are also applicable to bi-directional communication between surface equipment and downhole equipment.

A variety of communication and transmission techniques have been attempted to provide real time data from the vicinity of the bit to the surface during drilling. The utilization of MWD with real time data transmission provides substantial benefits during a drilling operation. For example, continuous monitoring of downhole parameters such as weight-on-bit, torque, directional surveys, and formation parameters in real time provides for a more efficient drilling operations. In fact, faster penetration rates, better trip planning, reduced equipment failures, fewer delays for directional surveys, and the elimination of a need to interrupt drilling for abnormal pressure detection is achievable using MWD techniques.

At present, there are four major categories of telemetry systems that have been used in an attempt to provide real time data from the vicinity of the drill bit to the surface, namely mud pressure pulses, insulated conductors, acoustics and electromagnetic waves.

In a mud pressure pulse system, the resistance of mud flow through a drill string is modulated by means of a valve and control mechanism mounted in a special drill collar near the bit. This type of system generates a pressure pulse that travels up the mud column at or near the velocity of sound in the mud. It has been found, however, that the rate of transmission of measurements is relatively slow due to pulse spreading, modulation rate limitations, and other disruptive limitations such as the requirement of mud flow. Common mud pulse systems are limited to data rates of approximately ten bits per second, with normal transmission rates of 2-4 bits per second.

Insulated conductors, or hard wire connection from the bit to the surface, is an alternative method for establishing downhole communications. This type of system is capable of a high data rate and two way communication is possible. It has been found, however, that this type of system requires a special drill pipe and special tool joint connectors which substantially increase the cost of a drilling operation. Also, these systems are prone to failure as a result of the abrasive conditions of the mud system and the wear caused by the rotation of the drill string.

Acoustic systems have provided a third alternative. Typically, an acoustic signal is generated near the bit and is transmitted through the drill pipe, mud column or the earth. It has been found, however, that the very low magnitude of the signal which can be generated downhole, along with the acoustic noise generated by the drilling system, makes signal detection difficult. Reflective and refractive interference resulting from changing diameters and thread makeup at the tool joints compounds the signal attenuation problem for drill pipe transmission.

The fourth technique used to telemeter downhole data to the surface uses the transmission of electromagnetic waves through the earth. It has been found, however, that in deep or noisy well applications, conventional electromagnetic systems are unable to generate a signal with sufficient magnitude to reach the surface.

In order to transmit higher data rates, repeaters have been proposed for both acoustic and electromagnetic systems. Installing in or connecting repeaters to the drill string have been described. See for example U.S. Pat. No. 6,075,461 to Harrison C. Smith, describing an electromagnetic repeater strapped to a drill string. These installations are highly susceptible to damage during drilling operations. Other devices, inserted in the drill string, typically limit the open diameter of the drill string that is required to run wireline tools and other safety equipment.

Therefore, there is a demonstrated need for a high data rate, non-intrusive system that is capable of telemetering real time information in a deep or noisy well between surface equipment and downhole equipment.

SUMMARY OF THE INVENTION

In one aspect the present invention contemplates a system for communicating information between downhole equipment in a wellbore and surface equipment. The invention comprises a first device disposed in a wellbore for receiving at least one first signal and transmitting at least one second signal. A surface device is used for receiving the at least one second signal and transmitting the at least one first signal. At least one repeater is disposed at a predetermined location in a wall of the wellbore for receiving and retransmitting the at least one first signal and the at least one second signal.

In another aspect, the invention contemplates a method for communicating information between downhole equipment in a wellbore and surface equipment, comprising; deploying a tubular member in the wellbore, the tubular member having a transmitter disposed therein; disposing at least one signal repeater at a predetermined location in a wall of the wellbore; and transmitting a signal from the transmitter to a surface receiver through the at least one repeater.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein:

FIG. 3 is a schematic drawing of a section of a wellbore having multiple repeaters according to one embodiment of the present invention; and FIG. 4 is a schematic drawing of a section of a well with a repeater being installed in a wall of the wellbore according to one embodiment of the present invention.

DESCRIPTION OF PREFERRED EMBODIMENTS

Figure 1:
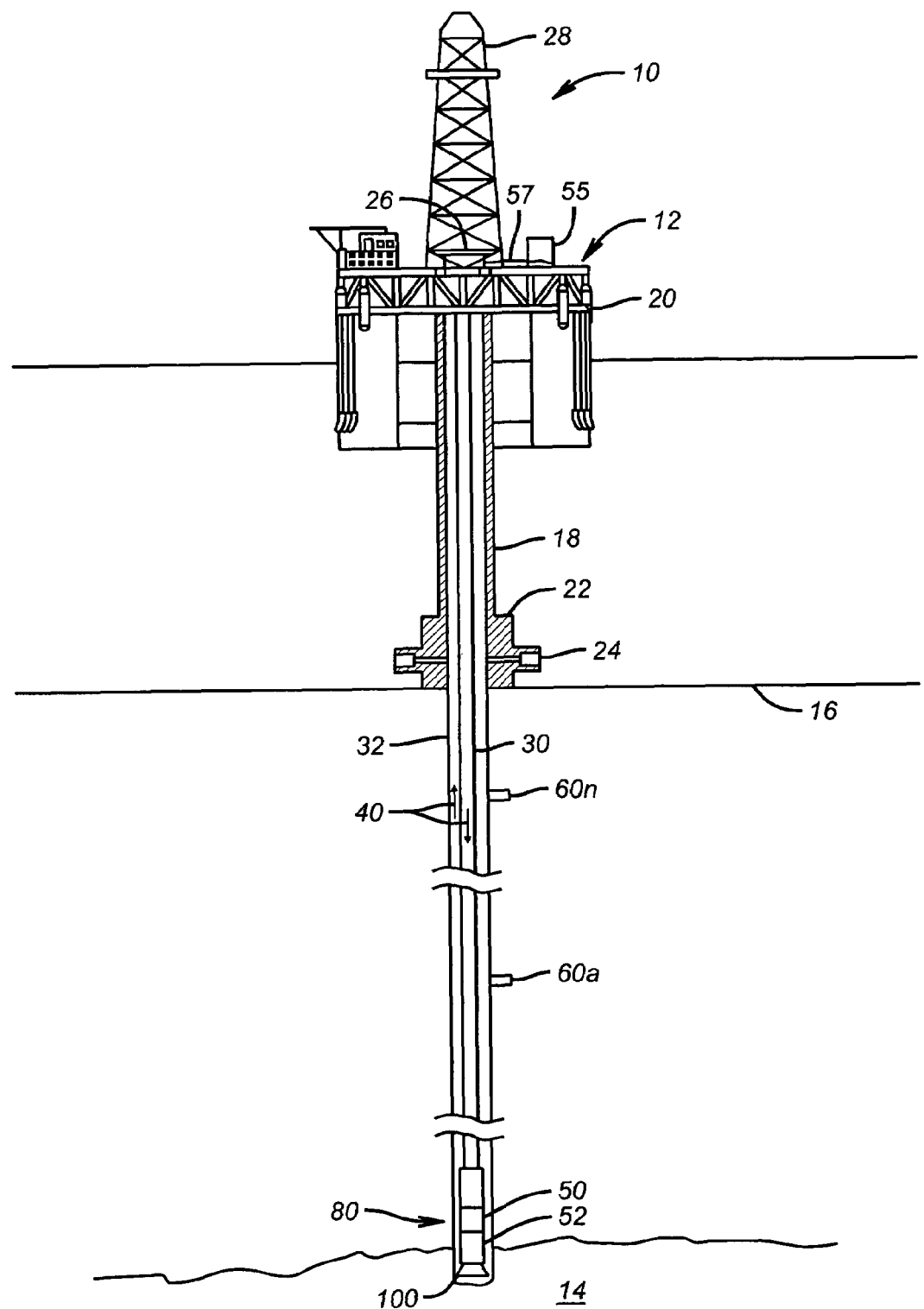
FIG. 1 is a schematic drawing of a drilling system according to one embodiment of the present invention.

Referring now to FIG. 1, a communication system including a signal generator and a plurality of signal repeaters for use with an offshore oil and gas drilling platform is schematically illustrated and generally designated 10. A semi-submersible platform 12 is centered over a submerged oil and gas formation 14 located below sea floor 16. A subsea conduit 18 extends from deck 20 of platform 12 to wellhead installation 22 including blowout preventers 24. Platform 12 has a hoisting apparatus 26 and a derrick 28 for manipulating drill string 30, positioned inside wellbore 32 during drilling operations. Drill string 30 maybe comprised of jointed tubing or alternatively may comprise coiled tubing. Wellbore 32 may be cased or uncased, depending upon the particular application, the depth of the well, and the strata through which the wellbore extends. In some applications, wellbore 32 will be partially cased, i.e., the casing will extend only partially down the length of wellbore 32. While described for an offshore well, the system and methods described herein are equally suitable for land operations.

A bottom hole assembly (BHA) 80 is attached to the bottom of drill string 30. BHA 80 comprises multiple tubular sections having a diameter commonly larger than the diameter of drill string 30. Drill bit 100 is attached to the bottom of BHA 100 for disintegrating the formation 14. A drilling fluid 40 is circulated from a surface pumping unit (not shown) through the drill string 30 and exits at the bit 100. The drilling fluid 40 carries drilling cuttings back up the annulus between the drill string 30 and the wellbore 32 to a surface cleaning unit from which the drilling fluid is recirculated. A Measurement While Drilling (MWD) system 52 with a plurality of sensors is disposed in BHA 80 for measuring various downhole parameters, including, but not limited to, formation evaluation parameters, directional survey parameters, and drilling parameters. The measured sensor data is transmitted by a signal transceiver 50 to surface transceiver 57 and the received signals are processed by surface system 55. The processed signals may be used to improve the drilling process and evaluate the downhole formation. Both the downhole transceiver 50 and the surface transceiver 57 are adapted to transmit and receive signals for enabling bi-directional communication between the downhole and surface systems. Alternatively, separate devices may be used to transmit and to receive signals at each location, while still enabling bi-directional communication.

The signals may be acoustic, electromagnetic (EM), and radio frequency (RF), or any other suitable transmission system suitable for telemetry of signals in a wellbore. Multiple transmission techniques may be enabled to provide backup communication capability.

Figure 2:
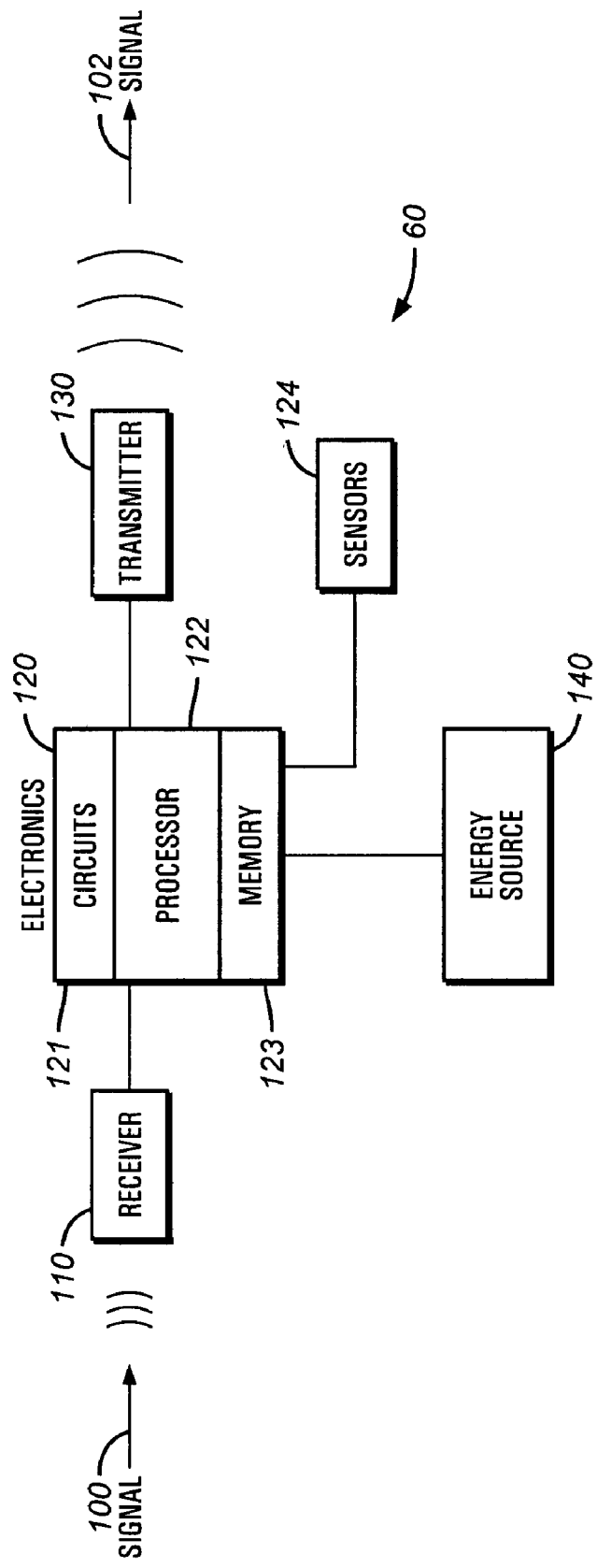
FIG. 2 is a block drawing of a repeater according to one embodiment of the present invention.

Signal repeaters 60 are disposed in the wall of wellbore 32 to periodically boost the strength of the signals as they are attenuated during transit through the transmission medium. In one embodiment, repeaters 60 are installed while drilling or shortly after drilling wellbore 32. Any number of such repeaters may be installed in the wall of wellbore 32. The repeaters 60 are spaced such that the signals transmitted by transceiver 50, while attenuated, still have sufficient magnitude to be readily received at least at the repeater 60 nearest the transmitter. Each repeater 60 (see FIG. 2) is self-contained and autonomous and comprises a receiver 110, electronics module 120, an energy source 140, and a transmitter 130. Receiver 110 and transmitter 130 may be packaged as the same device, or, alternatively, may be packaged as separate devices. Electronics module 120 comprises circuits 121 for conditioning the received signal and for powering the transmitter. In addition, electronics module 120 may contain a processor 122 having a memory 123 where processor 122 acts according to programmed instructions stored in memory 123 for controlling the operation of the repeater 60. Energy source 140 comprises batteries (not shown) which may be any batteries known in the art suitable for downhole use. Alternatively, the energy source may be a thermoelectric generator adapted to generate energy downhole based on the temperature gradients existing between the formation and the fluid 40 in wellbore 32. Such generators are commercially available and will not be described further. In yet another preferred embodiment, a thermoelectric generator may be used to recharge suitable rechargeable batteries. Such a technique would extend the life of the repeater essentially indefinitely to enable use throughout the life of the well.

In one preferred embodiment, repeater 60 has at least one sensor 124. Sensor 124 may be used to detect parameters of interest related to the surrounding formation and/or the fluid 40 in wellbore 32. Such sensors may include pressure, temperature, and resistivity devices for detecting fluid pressure, fluid temperature and fluid resistivity of wellbore and/or formation fluids. Changes in such parameters over time may be related to formation production ability. Repeater 60 may also include sensors for determining the health of the repeater, such as for example, battery charge. The data from such sensors is included as an addition to the retransmitted signal.

In operation, in one embodiment, a signal 101 is received, processed, amplified, and retransmitted as signal 102 at a signal strength sufficient to reach the next repeater. Successive repeaters are likewise spaced at predetermined locations to be able to readily receive the signal transmitted by the previous repeater.

Spacing of repeaters may be determined by modeling the transmission characteristics of the formation and wellbore 32. Alternatively, during the drilling operation, the transceiver 50 may periodically send a predetermined signal to the closest repeater which in turn sends a confirmation signal back to the downhole transceiver 50. When the return message is no longer detectable at the transceiver 50, the tool is raised in the hole until detection is reestablished and another repeater 60 is disposed in the wall of wellbore 32 using any of the techniques and devices described later. Multiple repeaters may be installed at each such location to provide redundant protection against repeater failure.

Repeater 60 may be adapted to receive and transmit multiple types of signals, such as, for example, EM and acoustic signals. Repeater 60 may be programmed to change signal type when the received signal falls below a predetermined threshold. Alternatively, repeater 60 may be adapted to always transmit multiple types of signal to provide redundancy. Each repeater 60 may have a unique identifier and be considered as a node in a network transmission system. Commands for data may be directed along the network to a particular node. The command may be executed at the repeater node and a subsequent response sent back to the requester.

Repeater 60 may be adapted to operate at multiple frequencies to enable bi-directional communication, with downlink signals and uplink signals being at different frequencies, as shown in FIG. 3.

In one preferred embodiment, repeaters 60 are deployed into the wellbore 32 in a pocket 61 in an insertion sub 62 (see FIG. 3). The repeater 60 is adapted to penetrate the wall of wellbore 32 when propelled by an explosive charge 63 similar to that used in perforating charges known in the art.

In another preferred embodiment, see FIG. 4, repeater 460 is carried in cavity 465 in insertion sub 462 that is part of the bottomhole assembly and that is controlled by the bottomhole transceiver (not shown). Repeater 460 is inserted in the wall of wellbore 432 by the operation of telescoping piston 463. Insertion sub 462 contains a hydraulic system (not shown) for actuating the telescoping piston 463 on command from the transceiver. Insertion sub 462 may be directly connected electrically to the BHA transceiver (not shown). Alternatively, the insertion sub 462 may communicate with the transceiver (not shown) using any other communication scheme known in the art, including, but not limited to, acoustic and electromagnetic techniques.

After the initial drilling of the well, the well may be completed using equipment, such as intelligent completion equipment, adapted to use the existing repeaters. In addition, if required, additional repeaters may be installed in open hole sections of the well. Sensor data taken at repeater locations may be directed to the intelligent completion equipment for use in adaptively controlling well flow in a completed well. It should be noted that the principles of the present invention are applicable not only during drilling, but throughout the life of a wellbore including, but not limited to, during logging, testing, completing and producing the well.

The foregoing description is directed to particular embodiments of the present invention for the purpose of illustration and explanation. It will be apparent, however, to one skilled in the art that many modifications and changes to the embodiment set forth above are possible without departing from the scope of the invention. It is intended that the following claims be interpreted to embrace all such modifications and changes.

What is claimed is:

1. A system for communicating information between a downhole location in a wellbore containing fluid therein and an uphole location, comprising:
    a first device disposed at one of said downhole and said uphole locations, said first device including a transmitter for transmitting a first signal;
    a second device disposed at the other of said downhole and said uphole locations, said second device including a receiver for receiving a second signal; and
    at least one repeater disposed at a predetermined location in a wall of the wellbore containing fluid therein, said repeater comprising a receiver for receiving said first signal that has been attenuated through a transmission medium, a circuit for amplifying the received signal and a transmitter for transmitting said second signal, wherein said second signal is indicative of said first signal.

2. The system of claim 1, wherein the electronics module comprises a processor, that acts according to programmed instructions, for controlling an operation of the repeater.

3. The system of claim 1, wherein the at least one repeater is adapted to receive and transmit a signal at a plurality of frequencies.

4. The system of claim 1, wherein the predetermined location is between said downhole location and said uphole location.

5. The system of claim 1, wherein the at least one repeater is autonomous.

6. The system of claim 1, wherein the first signal and the second signal are at least one of (i) an electromagnetic signal, (ii) a radio frequency signal, (iii) an acoustic signal and (iv) a mud pulse signal.

7. The system of claim 1, wherein the first signal and the second signal each is a wireless signal.

8. The system of claim 1, wherein the at least one repeater includes a plurality of repeaters in the wellbore wherein each repeater in the plurality of repeaters communicates with at least one additional repeater.

9. The system of claim 1, wherein the at least one repeater comprises:
    an electronics module; and
    an energy source.

10. The system according to claim 9, wherein the energy source is one of (i) a downhole generator, (ii) a thermoelectric generator, and (iii) a combination of a battery and a thermoelectric generator.

11. The apparatus of claim 9, wherein the energy source is a battery.

12. The system of claim 1, wherein the at least one repeater includes at least one sensor for detecting at least one parameter of interest related to one of: (1) health of the at least one repeater; and a downhole condition.

13. The system of claim 12, wherein the at least one sensor is at least one of (i) a pressure sensor, (ii) a temperature sensor, and (iii) a resistivity sensor.

14. The system of claim 12, wherein the at least one parameter of interest includes at least one of: (i) wellbore fluid pressure, (ii) wellbore fluid temperature, (iii) wellbore fluid resistivity (iv) formation fluid pressure (v) formation fluid temperature, and (vi) formation fluid resistivity.

15. The system of claim 12, wherein at least one of the first signal and the second signal includes data related to the at least one parameter of interest.

16. A method for communicating information between a downhole location in a wellbore containing fluid therein and an uphole location, comprising:
    disposing at least one signal repeater at a predetermined location in a wall of the wellbore containing fluid therein;
    transmitting a first signal from a first device located at one of said uphole location and said downhole location;
    receiving said first signal that has been attenuated through a transmission medium at the at least one repeater, amplifying the received signal and transmitting a second signal indicative of said first signal; and
    receiving said second signal at the other of said uphole and said downhole locations.

17. The method of claim 16, wherein the at least one repeater is disposed in the wall of the wellbore by using an explosive charge.

18. The method of claim 16, wherein the at least one repeater is disposed in the wall of the wellbore by using a hydraulic device.

19. The method of claim 16, wherein the first signal and the second signal are at least one of (i) an electromagnetic signal, (ii) a radio frequency signal, and (iii) an acoustic signal; and (iv) a mud pulse.

20. The method of claim 16, further comprising sensing at least one parameter of interest downhole by a sensor.

21. The method of claim 20, wherein the at least one parameter of interest is at least one of (i) wellbore fluid pressure, (ii) wellbore fluid temperature, (iii) wellbore fluid resistivity (iv) formation fluid pressure (v) formation fluid temperature, and (vi) formation fluid resistivity.

22. The method of claim 20, wherein the at least one of the first signal and the second signal includes data related to the at least one parameter of interest.

23. An apparatus for boosting signals in a communication system in a wellbore containing fluid therein, comprising at least one repeater disposed at a predetermined location in a wall of the wellbore containing the fluid therein, said at least one repeater receiving a first signal that has been attenuated through a transmission medium and transmitting a second boosted signal, wherein said second boosted signal is indicative of said first signal.

24. The apparatus of claim 21, wherein the at least one repeater is adapted to receive and transmit signals at a plurality of frequencies.

25. The apparatus of claim 23, wherein the first signal and second signal are transmitted during drilling of the wellbore.

26. The apparatus of claim 23, wherein the first signal and the second signal are at least one of (i) an electromagnetic signal, (ii) a radio frequency signal, (iii) an acoustic signal, and (iv) a mud pulse signal.

27. The apparatus of claim 23, wherein the first signal and the second signal are wireless signals.

28. The apparatus of claim 23, wherein the at least one repeater comprises at least one of:

a receiving device;

an electronics module;

a transmitting device; and an energy source.

29. The apparatus of claim 28 further comprising a processor that acts, according to programmed instructions for controlling an operation of the at least one repeater.

30. The apparatus according to claim 28, wherein the energy source is one of (i) a downhole generator, (ii) a thermoelectric generator, and (iii) a combination of a battery and a thermoelectric generator.

31. The apparatus of claim 23, further comprising at least one sensor for detecting at least one parameter of interest related to one of:

(1) a downhole condition and (ii) a health of the at least one repeater.

32. The apparatus of claim 31, wherein the at least one sensor is at least one of (i) a pressure sensor, (ii) a temperature sensor, and (iii) a resistivity sensor.

33. The apparatus of claim 31, wherein the at least one parameter of interest is at least one of (i) wellbore fluid pressure, (ii) wellbore fluid temperature, (iii) wellbore fluid resistivity (iv) formation fluid pressure (v) formation fluid temperature, and (vi) formation fluid resistivity.

34. The apparatus of claim 31, wherein at least one of the first signal and the second signal includes data related to the at least one parameter of interest.

* * * * *